(12) United States Patent
Isozaki et al.

(10) Patent No.: US 11,320,039 B2
(45) Date of Patent: May 3, 2022

(54) GEAR DEVICE

(71) Applicant: SUMITOMO HEAVY INDUSTRIES, LTD., Tokyo (JP)

(72) Inventors: Tetsushi Isozaki, Aichi (JP); Shigeo Watanabe, Aichi (JP); Aiko Hayashi, Aichi (JP)

(73) Assignee: SUMITOMO HEAVY INDUSTRIES, LTD., Tokyo (JP)

(*) Notice: Subject to any disclaimer, the term of this patent is extended or adjusted under 35 U.S.C. 154(b) by 360 days.

(21) Appl. No.: 16/386,877

(22) Filed: Apr. 17, 2019

(65) Prior Publication Data
US 2019/0323595 A1    Oct. 24, 2019

(30) Foreign Application Priority Data
Apr. 18, 2018  (JP) .............................. JP2018-079904

(51) Int. Cl.
*F16H 57/04*    (2010.01)
*F16H 47/04*    (2006.01)

(52) U.S. Cl.
CPC ......... *F16H 57/0408* (2013.01); *F16H 47/04* (2013.01); *F16H 57/0424* (2013.01); *F16H 57/0426* (2013.01)

(58) Field of Classification Search
CPC .. F16H 57/0408; F16H 47/04; F16H 57/0424; F16H 57/0426; F16H 57/0423; F16H 57/0457; F16H 57/045
See application file for complete search history.

(56) References Cited

U.S. PATENT DOCUMENTS

| | | | | |
|---|---|---|---|---|
| 3,529,698 A * | 9/1970 | Nelson | ................. | F16H 57/0447 184/6.12 |
| 3,763,961 A * | 10/1973 | Casale | ...................... | F16N 7/26 184/11.2 |
| 3,785,458 A * | 1/1974 | Caldwell | .............. | B62D 55/125 184/6.12 |
| 5,295,413 A * | 3/1994 | Sherman | .................. | B60K 1/00 74/421 A |
| 5,821,653 A * | 10/1998 | Kinto | ................... | F16H 57/0447 310/89 |
| 6,616,432 B2 * | 9/2003 | Szczepanski | ........... | F04C 2/082 184/11.1 |
| 6,719,096 B2 * | 4/2004 | Mogi | .................... | F16H 57/027 184/6.23 |
| 8,534,425 B2 * | 9/2013 | Jabs | .................... | F16H 57/0447 184/11.1 |
| 8,733,528 B1 * | 5/2014 | Goerend | ............. | F16H 57/0473 192/113.34 |

(Continued)

FOREIGN PATENT DOCUMENTS

JP    2008-095705 A    4/2008

*Primary Examiner* — Michael A Riegelman
(74) *Attorney, Agent, or Firm* — Michael Best & Friedrich LLP

(57) ABSTRACT

There is provided a gear device including a motor having a motor shaft, a gear mechanism, a coupling that couples the motor shaft and an input shaft of the gear mechanism with each other, a first space accommodating the gear mechanism and holding a lubricant, a communication passage allowing the first space and a second space for accommodating the coupling to communicate with each other, and a blocking member disposed between the gear mechanism and the communication passage.

17 Claims, 8 Drawing Sheets

(56) References Cited

U.S. PATENT DOCUMENTS

| | | | |
|---|---|---|---|
| 9,103,432 B2* | 8/2015 | Isomura | F16H 57/0423 |
| 10,208,848 B2* | 2/2019 | Hotait | F16H 57/0463 |
| 2006/0213303 A1* | 9/2006 | Shigemi | F16J 15/324 |
| | | | 74/467 |
| 2008/0127761 A1* | 6/2008 | Mineshima | F16H 57/033 |
| | | | 74/413 |
| 2008/0308354 A1* | 12/2008 | Gratzer | B60K 17/344 |
| | | | 184/6.12 |
| 2011/0192245 A1* | 8/2011 | Shioiri | F16H 57/0423 |
| | | | 74/467 |
| 2012/0096968 A1* | 4/2012 | Kawamoto | F16H 57/0409 |
| | | | 74/467 |
| 2013/0145879 A1* | 6/2013 | Nakamura | F16H 57/043 |
| | | | 74/467 |
| 2015/0152954 A1* | 6/2015 | Kajikawa | F16H 57/0457 |
| | | | 475/150 |
| 2016/0123454 A1* | 5/2016 | Tahara | F16H 57/0421 |
| | | | 74/467 |
| 2016/0123455 A1* | 5/2016 | Mikami | F16H 57/045 |
| | | | 74/467 |
| 2016/0186854 A1* | 6/2016 | Tahara | F16H 57/0427 |
| | | | 74/468 |
| 2016/0186855 A1* | 6/2016 | Tahara | F16H 57/0424 |
| | | | 74/413 |
| 2017/0102064 A1* | 4/2017 | Preston | F16H 57/0457 |
| 2017/0343100 A1* | 11/2017 | Kawarazaki | F16H 57/045 |
| 2018/0340604 A1* | 11/2018 | Yageta | F16H 57/0471 |
| 2019/0323595 A1* | 10/2019 | Isozaki | F16H 57/0424 |

* cited by examiner

100

100

GEAR DEVICE

RELATED APPLICATIONS

Priority is claimed to Japanese Patent Application No. 2018-079904, filed Apr. 18, 2018, the entire content of which is incorporated herein by reference.

BACKGROUND

Technical Field

Certain embodiments of the present invention relate to a gear device.

Description of Related Art

In the related art, the present applicant discloses a gear power transmission device in which a casing internally accommodates a reduction gear unit that decelerates rotation of an input shaft so as to transmit the rotation to an output shaft.

In a gear power transmission device disclosed in the related art, a reduction gear unit includes a plurality of gears meshing with each other. The plurality of gears are lubricated by a lubricant held inside a casing. Since the gears are rotated, the lubricant may leak out of the casing. Depending on a usage, the gear power transmission device may be greatly affected by contamination resulting from the lubricant in some cases. Therefore, in a case where a large amount of the lubricant leaks out, an application range of the gear power transmission device is limited. For these reasons, the gear power transmission device disclosed in the related art has room for improvement in terms of preventing a leakage of the lubricant.

SUMMARY

According to an embodiment of the present invention, there is provided a gear device includes a motor having a motor shaft, a gear mechanism, a coupling that couples the motor shaft and an input shaft of the gear mechanism with each other, a first space accommodating the gear mechanism and holding a lubricant, a communication passage allowing the first space and a second space for accommodating the coupling to communicate with each other, and a blocking member disposed between the gear mechanism and the communication passage.

DETAILED DESCRIPTION

Figure 1:
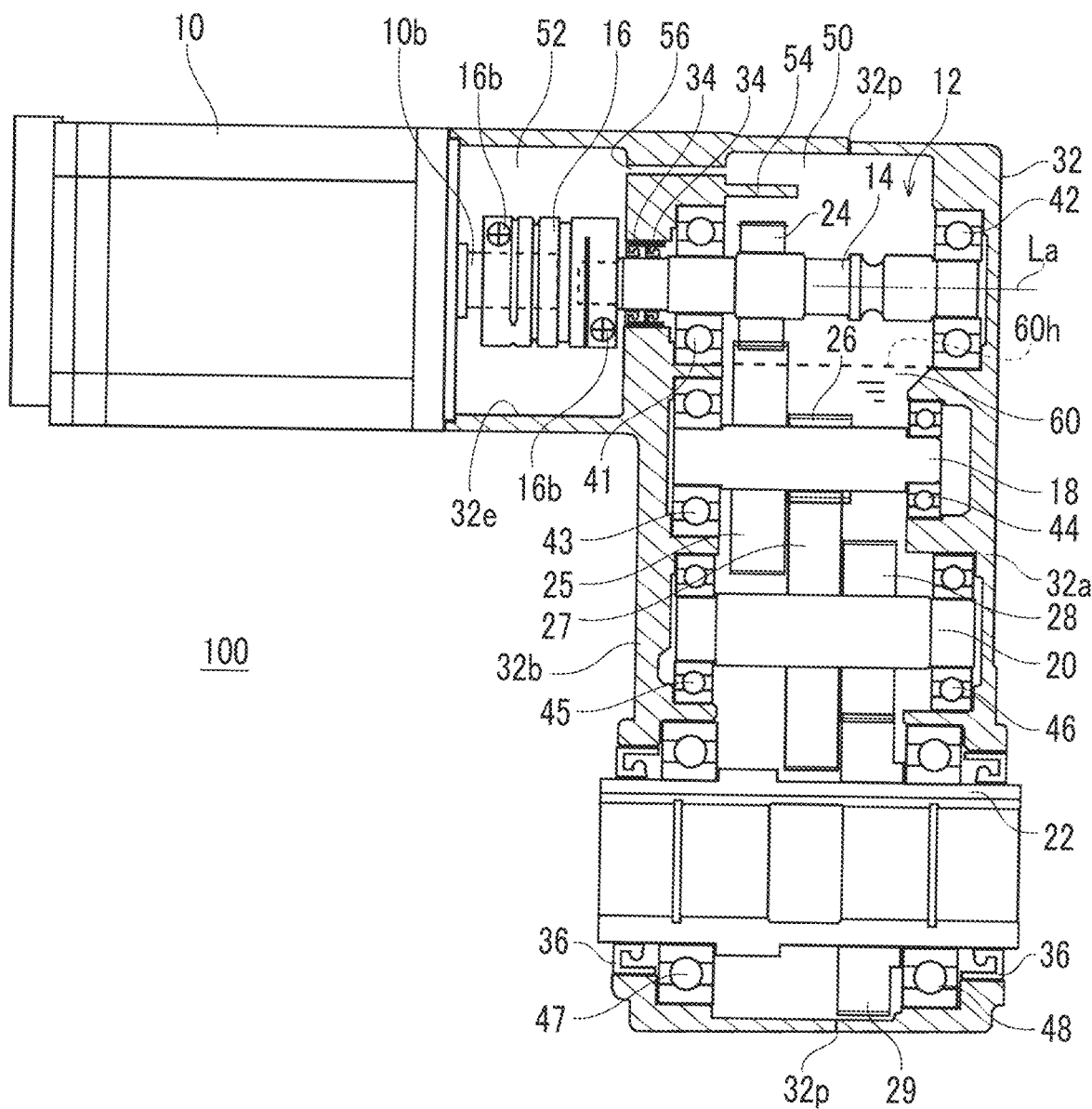
FIG. 1 is a front sectional view illustrating a gear device according to one embodiment.

It is desirable to provide a gear device which can prevent a leakage of a lubricant.

According to an embodiment, the blocking member can be disposed between the gear mechanism and the communication passage.

Any desired combinations of configuration elements described above or substitutions between the configuration elements, expressions, methods, or systems according to the present invention may be effectively adopted as an embodiment of the present invention.

According to the present invention, it is possible to provide a gear device which can prevent a leakage of a lubricant.

Hereinafter, preferred embodiments of the present invention will be described with reference to the drawings. In the embodiments, comparative examples, and modification examples, the same reference numerals will be given to configuration elements or members which are the same or equivalent to each other, and repeated description will be appropriately omitted. In addition, dimensions of members in each drawing are appropriately enlarged and reduced in order to facilitate understanding. In addition, in each drawing, some members which are not important in describing the embodiments will be omitted in the illustration.

In addition, terms including ordinal numbers such as first and second are used to describe various configuration elements. However, the terms are used only to distinguish one configuration element from the other configuration element. The terms do not limit the configuration elements.

One Embodiment

Figure 2:
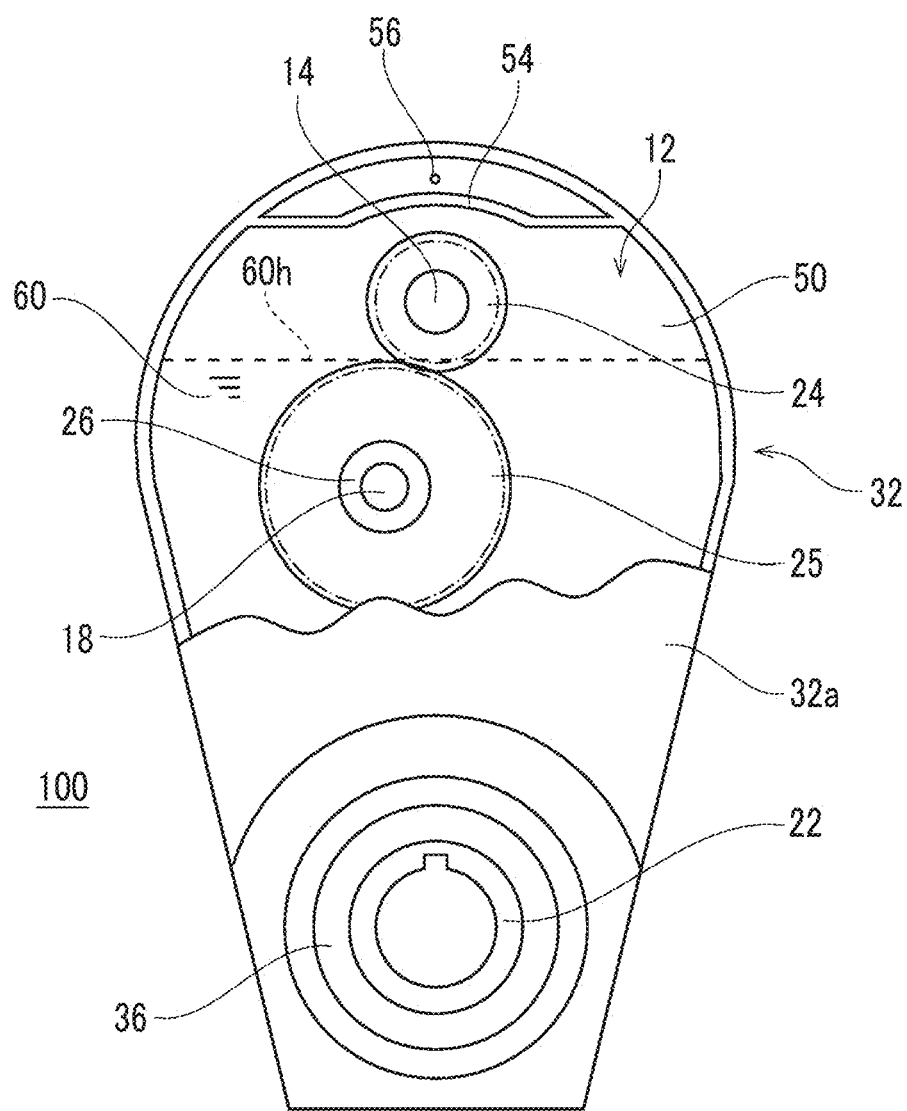
FIG. 2 is a side view of the gear device according to the one embodiment.

Hereinafter, a configuration of a gear device 100 according to one embodiment will be described with reference to FIGS. 1 and 2. For example, the gear device 100 can be suitably used in a food factory which requires contamination control. FIG. 1 is a front sectional view illustrating the gear device 100 according to the one embodiment. FIG. 2 is a side view of the gear device 100, and illustrates a partially broken casing. The gear device 100 according to the present embodiment has a motor 10, a gear mechanism 12, and a coupling 16. The motor 10 has a motor shaft 10b. The motor 10 is not particularly limited as long as the motor 10 can drive the gear mechanism 12. The motor 10 according to the present embodiment is an AC servomotor. The gear mechanism 12 has a first shaft 14 serving as an input shaft and a fourth shaft 22 serving as an output shaft, and decelerates rotation input to the first shaft 14 so as to output the rotation from the fourth shaft 22. Hereinafter, a direction extending along a central axis La of the first shaft 14 will be referred to as an "axial direction". A circumferential direction and a radial direction of a circle centered on the central axis La will be respectively abbreviated as a "circumferential direction" and a "radial direction".

Coupling

The coupling 16 will be described. The coupling 16 couples the motor shaft 10b and the first shaft 14 with each other. The coupling 16 may be a known coupling based on various principles. For example, the coupling 16 may be a spline coupling which cuts a spline between the shaft and the coupling, or may be a key coupling using a key. The coupling 16 includes a plurality of set screws 16b. A coupling target shaft is inserted into the coupling 16 in a state where the set screws 16b are loosened. In this manner, the set screws 16b are fastened, thereby fixedly coupling the coupling 16 with the coupling target shaft by means of friction fastening. The set screws 16b is fastened using a tool (not illustrated) inserted from an opening portion (to be described later).

The gear device 100 according to the present embodiment has a casing 32 for accommodating the gear mechanism 12 and the coupling 16. The casing 32 can be formed of various materials, and is formed by means of aluminum die casting according to the present embodiment. The casing 32 includes a first casing 32a illustrated on a right side of a parting 32p in the drawing and a second casing 32b illustrated on a left side of the parting 32p. The first casing 32a and the second casing 32b define a first space 50 for accommodating the gear mechanism 12. The second casing 32b defines a second space 52 for accommodating the coupling 16 together with an end surface of the motor 10. The first space 50 is a space where external air introduction and internal air discharge are substantially prevented. The first space 50 holds a lubricant 60 for lubricating the gear mechanism 12. The second space 52 is a space for communicating with an exterior via a clearance (to be described later).

Communication Passage

If internal pressure of the first space 50 increases due to temperature rise during an operation, there is a possibility that the lubricant 60 may be ejected from an oil seal. Therefore, the gear device 100 according to the present embodiment has a communication passage 56 allowing the first space 50 and the second space 52 to communicate with each other. It is preferable that the communication passage 56 is disposed at a position separated upward from a region where the lubricant 60 is always present. According to the present embodiment, the communication passage 56 is located on a vertically upper side of the gear mechanism 12. The communication passage 56 in this example is a hole drilled on the second casing 32b and penetrating in the axial direction. Since the gear device 100 has the communication passage 56, the first space 50 communicates with the exterior via the communication passage 56 and the second space 52.

Lubricant Storage

Since the gear device 100 has the communication passage 56, mist of the lubricant 60 may enter the second space 52 from the first space 50. Therefore, a lower surface 32e of the second casing 32b which defines a lower portion of the second space 52 functions as a lubricant storage for storing the lubricant 60 entering the second space 52. After reaching the second space 52, the lubricant 60 adheres to a wall surface surrounding the second space 52. Thereafter, the lubricant 60 moves downward due to gravity, and is collected on the lower surface 32e. According to this configuration, the lubricant 60 can be prevented from flowing outward.

Gear Mechanism

Next, the gear mechanism 12 will be described. As illustrated in FIG. 1, the gear mechanism 12 has a second shaft 18 and a third shaft 20 which serve as intermediate shafts, a plurality of gears disposed in the respective shafts, a plurality of bearings for rotatably supporting the respective shafts, and the lubricant 60. The first shaft 14, the second shaft 18, the third shaft 20, and the fourth shaft 22 respectively extend in the axial direction between the first casing 32a and the second casing 32b. The first shaft 14, the second shaft 18, and the third shaft 20 according to the present embodiment are solid shafts, and the fourth shaft 22 according to the present embodiment is a hollow shaft. The first shaft 14, the second shaft 18, and the third shaft 20 may be the hollow shafts, and the fourth shaft 22 may be the solid shaft.

The first shaft 14 is rotatably supported by first bearings 41 and 42 in the first casing 32a and the second casing 32b. A first driving gear 24 is fixed to the first shaft 14. The second shaft 18 is rotatably supported by second bearings 43 and 44 in the first casing 32a and the second casing 32b. A second driven gear 25 meshing with the first driving gear 24 and a second driving gear 26 are fixed to the second shaft 18.

The third shaft 20 is rotatably supported by third bearings 45 and 46 in the first casing 32a and the second casing 32b. A third driven gear 27 meshing with the second driving gear 26 and a third driving gear 28 are fixed to the third shaft 20. The fourth shaft 22 is rotatably supported by fourth bearings 47 and 48 in the first casing 32a and the second casing 32b. A fourth driven gear 29 meshing with the third driving gear 28 is fixed to the fourth shaft 22. The plurality of gears may be spur gears, but are helical gear in this example. The gear mechanism 12 configured in this way sequentially decelerates the rotation input to the first shaft 14 by using the plurality of gears, and outputs the rotation from the fourth shaft 22.

In the gear mechanism 12, the first shaft 14, the second shaft 18, the third shaft 20, and the fourth shaft 22 are rotated in this order at high speed. That is, the first shaft 14 is a high speed shaft rotated at higher speed than the second shaft 18, the third shaft 20, and the fourth shaft 22. The second shaft 18, the third shaft 20, and the fourth shaft 22 are low speed shafts rotated at lower speed than the first shaft 14. In addition, the first shaft 14, the second shaft 18, the third shaft 20, and the fourth shaft 22 are located in this order at a high position in a vertical direction. That is, the first shaft 14 is located at a higher position in the vertical direction than the second shaft 18, the third shaft 20, and the fourth shaft 22. The second shaft 18, the third shaft 20, and the fourth shaft 22 are located at a lower position in the vertical direction than the first shaft 14.

Lubricant

The lubricant 60 will be described. The lubricant 60 is not particularly limited as long as the lubricant 60 can lubricate the plurality of gears, and may be oil or grease. The lubricant 60 according to the present embodiment is high consistency (soft) grease in order to improve lubricity of the plurality of gears. The high consistency grease has higher fluidity due to temperature rise during the operation, and is likely to flow outward. Therefore, according to the present embodiment, in order to prevent the lubricant 60 from flowing outward, the blocking member 54 is disposed between the gear mechanism 12 and the communication passage 56 as illustrated in FIG. 1. The blocking member 54 will be described later.

If a liquid level 60h of the lubricant 60 is excessively high, the lubricant 60 moves close to the communication passage 56, thereby causing a possibility that the lubricant 60 may increasingly flow outward. Therefore, the liquid level 60h of the lubricant 60 according to the present embodiment is set to be positioned on a vertically lower side of the first shaft 14 serving as the high speed shaft. In a case where the lubricant 60 is grease, the liquid level 60h of the lubricant 60 shows a liquid level in a state where the lubricant 60 no longer moves when the operation is stopped. That is, the liquid level 60h of the lubricant 60 shows a liquid level in a state where the lubricant 60 no longer moves using the gravity of the lubricant 60 adhering to the casing or the gear after a sufficient time elapses from when the operation is stopped.

Oil Seal

The second space 52 side of the first bearing 41 has an oil seal which prevents the lubricant 60 from flowing out to the second space 52 side. The oil seal according to the present embodiment includes two oil seals 34 continuously disposed in the axial direction. The two oil seals 34 are located between a through-hole which the first shaft 14 of the second casing 32*b* penetrates and the first shaft 14. As the oil seal 34, a known oil seal which prevents a leakage of the lubricant can be used. Since the first shaft 14 is rotated at relatively high speed, the oil seal 34 is likely to be progressively degraded. Therefore, in this example, two oil seals are located.

The oil seals 36 which prevent the lubricant 60 from flowing outward are respectively disposed on external space sides of the fourth bearings 47 and 48. One of the oil seals 36 is located between the through-hole which the fourth shaft 22 of the first casing 32*a* penetrates and the fourth shaft 22. The other one of the oil seals 36 is located between the through-hole which the fourth shaft 22 of the second casing 32*b* penetrates and the fourth shaft 22. As the oil seal 36, a known oil seal which prevents a leakage of the lubricant can be used. Since the fourth shaft 22 is rotated at relatively low speed, the oil seal 36 is less likely to be degraded. Therefore, in this example, one oil seal is located.

The two oil seals 34 are located on the vertically upper side of the liquid level 60*h* of the lubricant 60. Even in a case where the oil seal 34 is degraded due to the high speed rotation, it is possible to reduce a possibility that the lubricant 60 may directly flow outward. The oil seal 36 is located on the lower side of the liquid level 60*h* of the lubricant 60. Since the oil seal 36 is filled with the lubricant 60, the degradation of the oil seal 36 can be minimized.

Comparative Example

Figure 3:
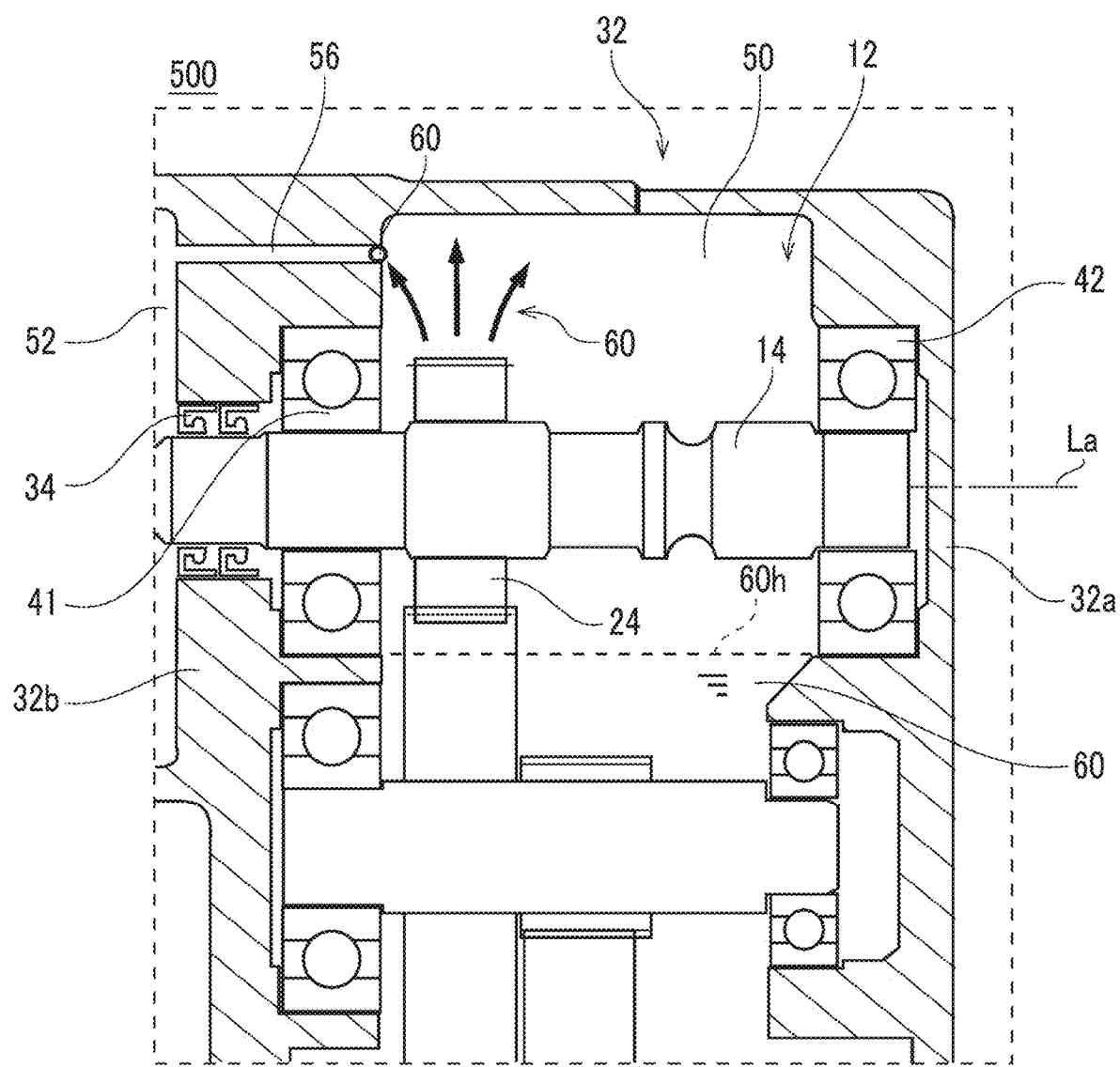
FIG. 3 is an enlarged sectional view illustrating a periphery of a communication passage according to a comparative example.

Prior to description of the blocking member 54, a comparative example will be described with reference to FIG. 3. FIG. 3 is an enlarged sectional view illustrating a periphery of the communication passage 56 of a gear device 500 according to the comparative example. The gear device 500 according to the comparative example is different from the gear device 100 according to the one embodiment in that the gear device 500 does not include the blocking member 54. Other configurations are the same as those according to the one embodiment.

As illustrated in FIG. 3, if the gear of the gear mechanism 12 is rotated, the gear rolls up the lubricant 60. A portion of the lubricant 60 adheres to the communication passage 56 so as to close the communication passage 56. If the internal air is thermally expanded due to the rotation of the gear mechanism 12 and internal pressure of the first space 50 increases, the lubricant 60 closing the communication passage 56 is ejected from the communication passage 56 to the second space 52 side. While the gear mechanism 12 is rotated, the lubricant 60 is rolled up so as to close the communication passage 56, and a cycle for ejecting the lubricant 60 to the second space 52 is continuously repeated. During the cycle, the lubricant 60 is continuously stored in the second space 52. As a result, the amount of the lubricant 60 flowing outward of the second space 52 increases.

Figure 4:
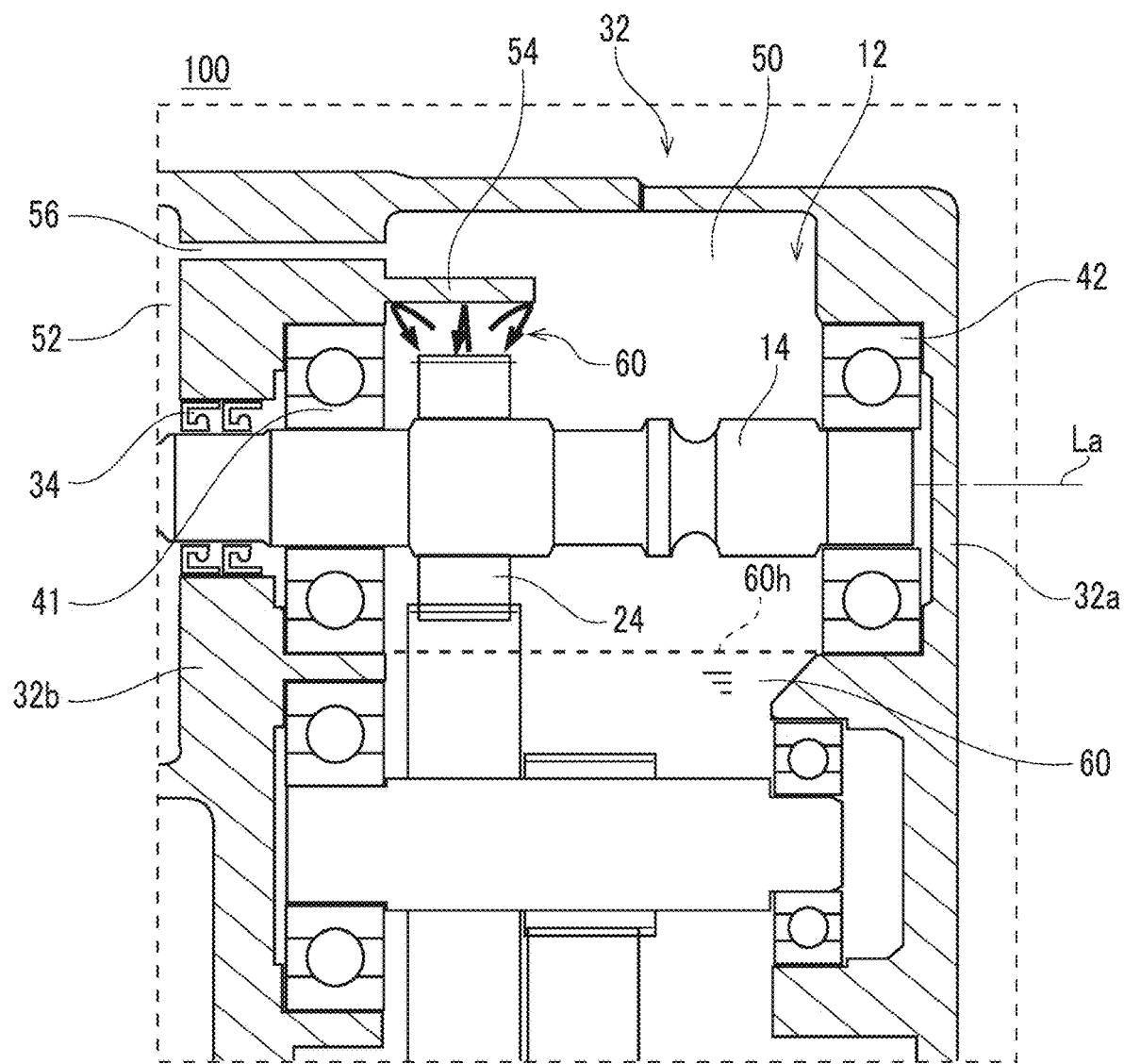
FIG. 4 is an enlarged sectional view illustrating the periphery of a communication passage according to the one embodiment.

The gear device 100 according to the present embodiment will be described in contrast to the comparative example. FIG. 4 is an enlarged sectional view illustrating the periphery of the communication passage 56 according to the present embodiment. According to the present embodiment, the blocking member 54 disposed between the gear mechanism 12 and the communication passage 56 blocks the lubricant 60 rolled up by the gear mechanism 12. Accordingly, it is possible to significantly reduce the amount of the lubricant 60 reaching the communication passage 56. As a result, a slight amount of the lubricant 60 enters the second space 52. Therefore, it is possible to significantly reduce the lubricant 60 flowing outward.

Blocking Member

The blocking member 54 may be disposed at any location between the gear mechanism 12 and the communication passage 56, as long as the lubricant 60 is blocked. The blocking member 54 according to the present embodiment is disposed between the first driving gear 24 closest to the communication passage 56 out of the gears of the gear mechanism 12 and the communication passage 56. As illustrated in FIG. 4, the blocking member 54 horizontally protrudes toward the first casing 32*a* from the vicinity of the communication passage 56 of the second casing 32*b*. The blocking member 54 has a hood shape which covers the upper side of the first driving gear 24. In the blocking member 54, a portion covering the upper side of the first driving gear 24 has an arc shape in a side view (refer to FIG. 2).

Figure 5A:
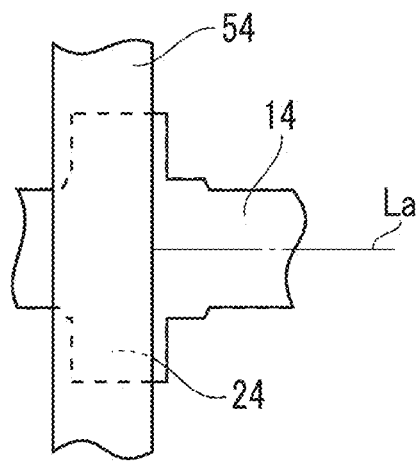
FIGS. 5A and 5B are top views illustrating a blocking member and a gear according to the one embodiment.
Figure 5B:
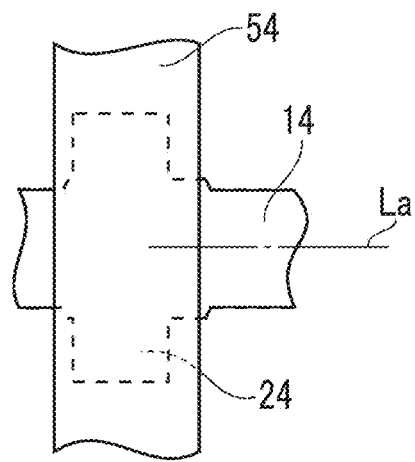

When viewed in the vertical direction, the blocking member 54 may be disposed so as to at least partially overlap the first driving gear 24. FIGS. 5A and 5B are top views illustrating the blocking member 54 and the first driving gear 24 of the gear device 100. FIG. 5A illustrates a state where the blocking member 54 overlaps a portion of the first driving gear 24. In this case, a protruding amount of the blocking member 54 is small. Accordingly, the blocking member 54 can be easily formed. FIG. 5B illustrates a state where the blocking member 54 overlaps the whole first driving gear 24. In this case, the blocking member 54 can more effectively prevent a leakage of the lubricant.

Opening Portion

Figure 6:
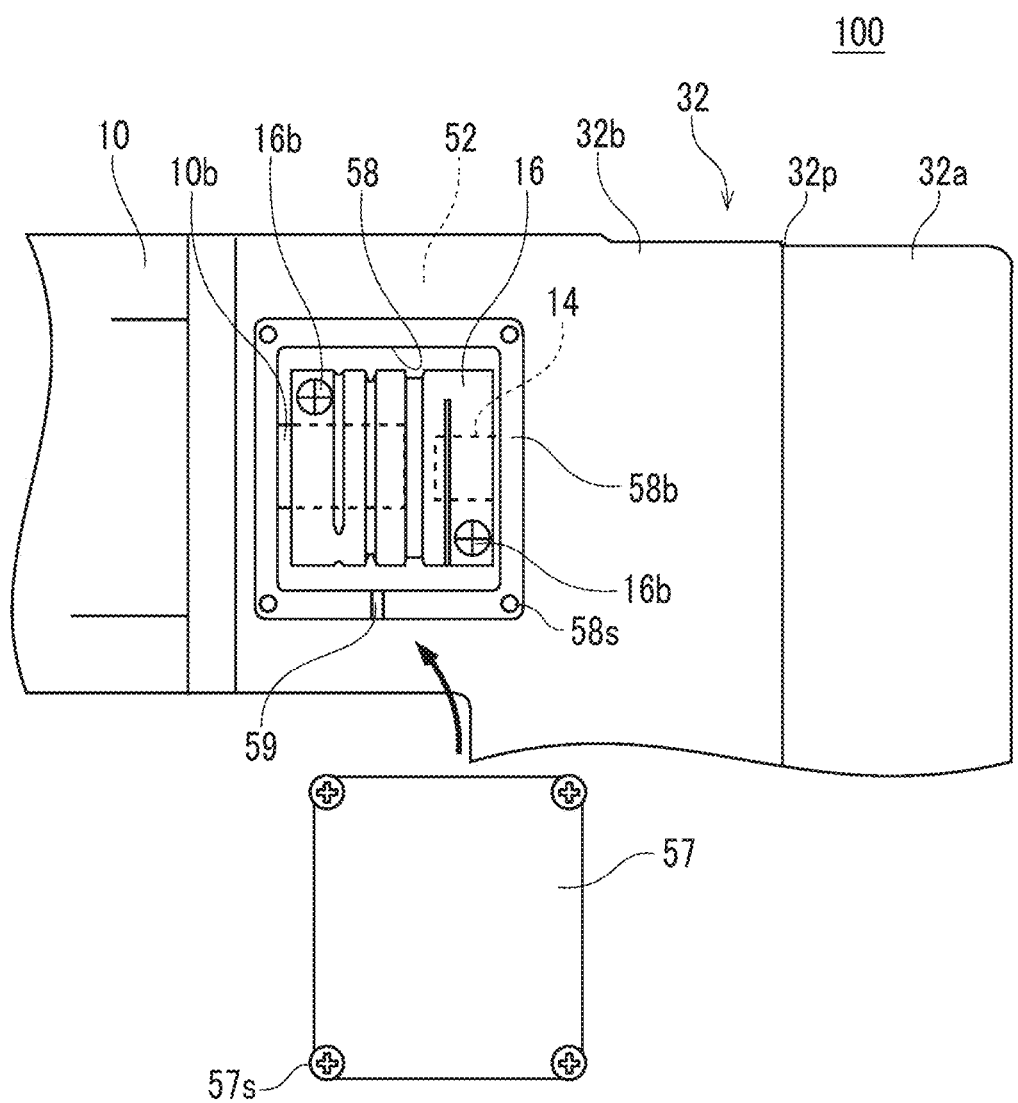
FIG. 6 is a front view illustrating the periphery of an opening portion according to the one embodiment.

Next, referring to FIG. 6, the opening portion 58 disposed in the second casing 32*b* will be described. FIG. 6 is a front view illustrating the periphery of the opening portion 58. The second casing 32*b* which defines the second space 52 has the opening portion 58 into which a tool (not illustrated) for coupling the coupling 16 is inserted. The opening portion 58 has a size and shape which can operate the set screw 16*b* of the coupling 16 by inserting the tool into the opening portion 58. The opening portion 58 according to the present embodiment is a substantially rectangular opening disposed on the front surface side of the second casing 32*b*. In the opening portion 58, a peripheral edge 58*b* for attaching a plate-shaped cover member 57 is disposed so as to frame the opening. The cover member 57 is a substantially rectangular plate-shaped member, and is fixed to the peripheral edge 58*b* with a seal (not illustrated) interposed therebetween, for example, by using four screws 57*s*. The cover member 57 is fixed by screwing the four screws 57*s* to female screws 58*s* disposed in the peripheral edge 58*b*.

As described above, a clearance 59 through which air flows via the opening portion 58 is disposed between the second space 52 and an external atmosphere. The clearance 59 according to the present embodiment is disposed between the cover member 57 and the peripheral edge 58*b* of the opening portion 58. As illustrated in FIG. 6, the clearance 59 is a linear groove formed in an upward-downward direction over the inside and the outside of the peripheral edge 58*b*, and functions as a passage for allowing the second space 52 to communicate with the exterior.

An operation of the gear device 100 configured as described above will be described. If the motor shaft 10b of the motor 10 is rotated, the first shaft 14 coupled via the coupling 16 is rotated. If the first shaft 14 is rotated, rotation thereof is sequentially decelerated by the first driving gear 24, the second driven gear 25, the second driving gear 26, the third driven gear 27, the third driving gear 28, and the fourth driven gear 29, and is transmitted to the fourth shaft 22. If the fourth shaft 22 is rotated, a load device (not shown) coupled with the fourth shaft 22 is rotationally driven. Hitherto, the one embodiment has been described.

Another Embodiment

Figure 7:
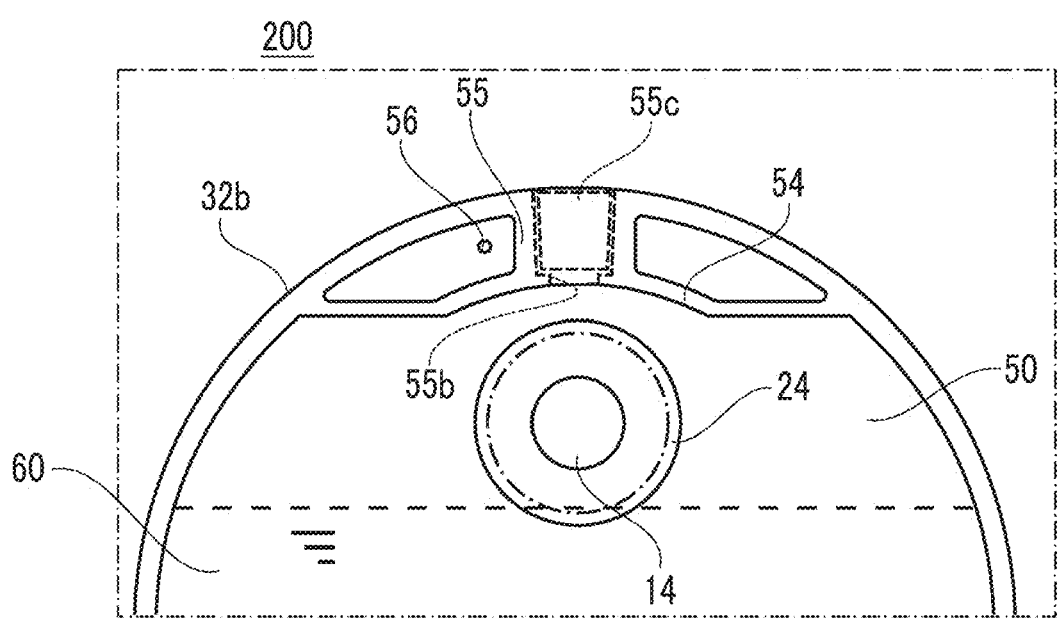
FIG. 7 is a side view illustrating a periphery of a blocking member according to another embodiment.

Next, a gear device 200 according to another embodiment will be described with reference to FIG. 7. FIG. 7 is a side view illustrating the periphery of the blocking member 54 of the gear device 200 according to the other embodiment. In the drawing and the description of the other embodiment, the same reference numerals will be given to configuration elements or members which are the same as or equivalent to those according to the one embodiment. The descriptions repeated from the one embodiment will be appropriately omitted, and a configuration different from that according to the one embodiment will be mainly described. The other embodiment is different from the one embodiment in that the gear device 200 has a reinforcing member 55 for reinforcing the blocking member 54 and the reinforcing member 55 has a greasing hole 55b, and the other configurations are the same as those according to the one embodiment.

Reinforcing Member

If the blocking member 54 is deformed, there is a possibility of coming into contact with the first driving gear 24. Therefore, the other embodiment adopts the reinforcing member 55 which connects the second casing 32b and the blocking member 54 to each other so as to reinforce the blocking member 54. A form of the reinforcing member 55 is not particularly limited as long as the blocking member 54 can be reinforced. The reinforcing member 55 according to the other embodiment is a rib-shaped portion extending downward from the upper portion of the second casing 32b and combined with the blocking member 54. In this example, the reinforcing member 55 is integrally formed with the second casing 32b and the blocking member 54. The communication passage 56 is located at a position avoiding the reinforcing member 55.

Greasing Hole

According to the other embodiment, the greasing hole 55b is disposed in order to supply the lubricant 60 to the first space 50. A form of the greasing hole 55b is not particularly limited as long as the lubricant 60 can be supplied. The greasing hole 55b according to the other embodiment penetrates the reinforcing member 55 upward and downward from the upper surface of the second casing 32b to the lower surface of the blocking member 54. In order to prevent the lubricant 60 from flowing outward and to prevent foreign matters from entering the greasing hole 55b, a lid member 55c for closing the greasing hole 55b is mounted on the greasing hole 55b. A form of the lid member 55c is not particularly limited as long as the lubricant 60 can be prevented from flowing outward. For example, a female screw may be formed in the greasing hole 55b, and a male screw may be formed in the lid member 55c so that these are screwed together.

According to the other embodiment configured as described above, the gear device 200 is operated in the same manner as the one embodiment, and the same operation and effect are achieved similarly to the one embodiment. Hitherto, the other embodiment has been described.

Hitherto, examples according to the embodiments of the present invention have been described in detail. The above-described embodiments are merely specific examples for embodying the present invention. Contents of the embodiments do not limit the technical scope of the present invention. Many design changes such as changes, additions, and deletions of the configuration elements can be made within the scope not departing from the concept of the invention stipulated in the appended claims. In the above-described embodiments, the contents which can be changed in design in this way have been described using terms of "in the embodiment" and "according to the embodiment". However, as a matter of course, the design change is also allowed for the contents described without using the terms. In addition, a hatched cross section of the drawing does not limit a material of a hatched object.

Hereinafter, a modification example will be described. In the drawings and the description of the modification example, the same reference numerals will be given to configuration elements or members which are the same as or equivalent to those according to the embodiments. The description repeated from the embodiments will be appropriately omitted, and configurations different from those according to the one embodiment will be mainly described.

First Modification Example

In the one embodiment, an example has been described in which the blocking member 54 is disposed in the second casing 32b so as to extend from the second casing 32b toward the first casing 32a. However, the present invention is not limited thereto. The blocking member 54 may be disposed in the first casing 32a so as to extend from the first casing 32a toward the second casing 32b. Alternatively, the blocking member 54 may be disposed in both the second casing 32b and the first casing 32a.

Figure 8:
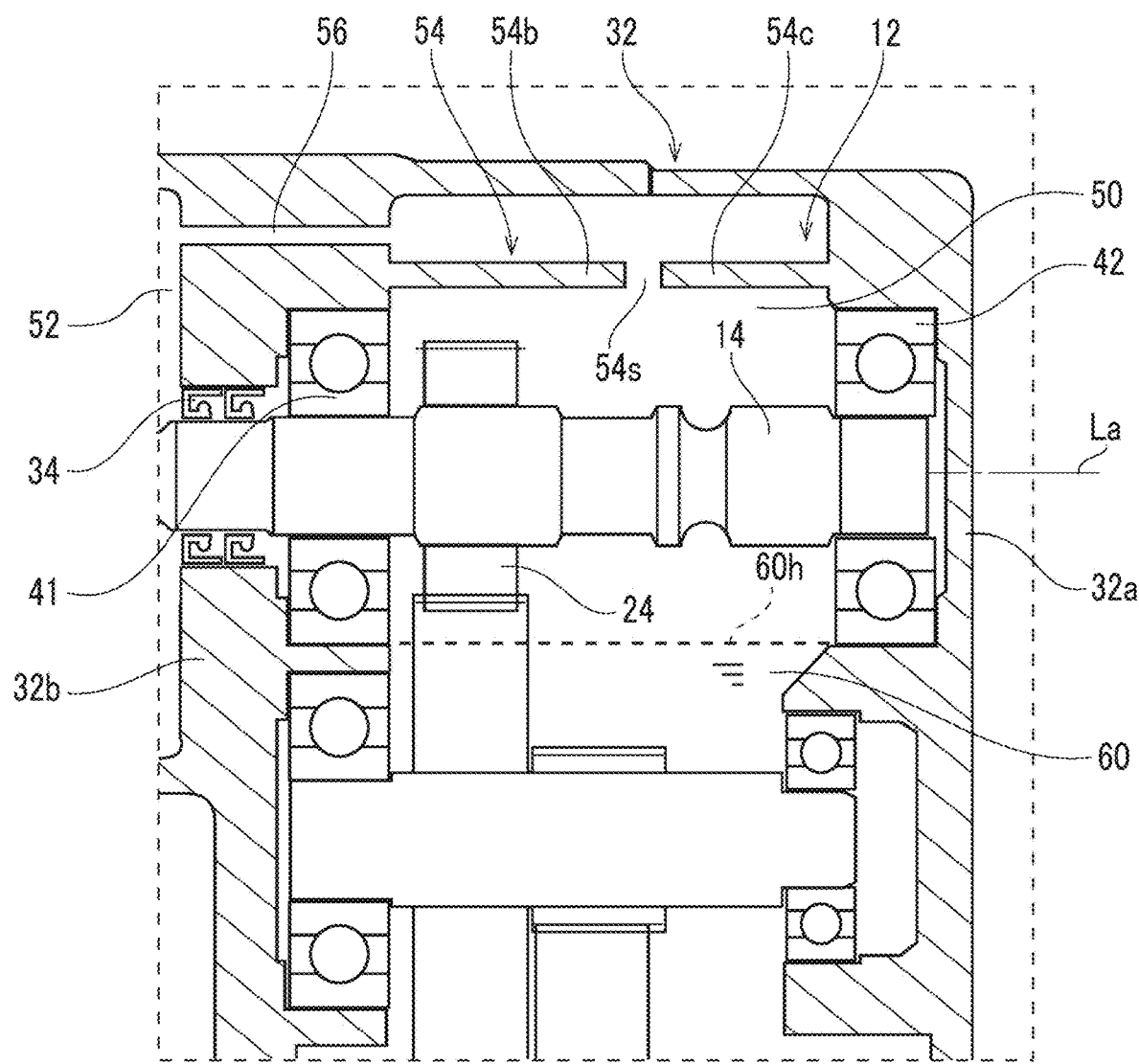
FIG. 8 is an enlarged sectional view illustrating a periphery of a blocking member according to a first modification example.

FIG. 8 is a front view illustrating the periphery of the blocking member 54 according to a first modification example. The blocking member 54 in this example includes blocking members 54b and 54c horizontally extending from mutually facing surfaces of the second casing 32b and the first casing 32a. A clearance 54s is disposed between the blocking members 54b and 54c in order to relieve an increase in the internal pressure of the first space 50. The blocking members 54b and 54c may be disposed at mutually different positions in a height direction.

In the one embodiment, an example has been described in which the gear device 100 adopts a parallel shaft type where the first shaft 14 on the input side and the fourth shaft 22 on the output side are arranged in parallel to each other. However, the present invention is not limited thereto. For example, the gear device 100 may adopt an orthogonal shaft type.

In the one embodiment, an example has been described in which the clearance 59 is disposed between the cover member 57 and the peripheral edge 58b of the opening portion 58. However, the present invention is not limited thereto. The clearance 59 is not limited to a position between the cover member 57 and the opening portion 58. For example, the clearance 59 may be a hole formed in the cover member 57.

Other Modification Examples

In the one embodiment, an example has been described in which the opening portion 58 is a substantially rectangular opening disposed on the front surface side of the second casing 32b which defines the second space 52. However, the present invention is not limited thereto. For example, the opening portion 58 may be disposed at a location other than the front surface side, such as the rear surface side and the upper surface side of the second casing 32b. For example, if the opening portion is attached to the upper surface side, the lubricant is much less likely to leak outward of the opening portion. Alternatively, for example, the opening portion 58 may have a shape other than the rectangular shape, such as a circular shape and an oval shape.

In the other embodiment, an example has been described in which the reinforcing member 55 is integrally formed with the second casing 32b and the blocking member 54. However, the present invention is not limited thereto. The reinforcing member 55 may be formed separately from the second casing 32b or the blocking member 54 so that all of these are combined with each other.

According to the above-described respective modification examples, the same operation and effect are achieved similarly to the one embodiment.

Any desired combination of the above-described respective embodiments and modification examples is usefully adopted as an embodiment according to the present invention. A new embodiment adopted by the combination achieves both the respective effects of the respective embodiments and modification examples which are combined with each other.

It should be understood that the invention is not limited to the above-described embodiment, but may be modified into various forms on the basis of the spirit of the invention. Additionally, the modifications are included in the scope of the invention.

What is claimed is:

1. A gear device comprising:
   a motor having a motor shaft;
   a gear mechanism;
   a coupling that couples the motor shaft and an input shaft of the gear mechanism with each other;
   a first space accommodating the gear mechanism and holding a lubricant;
   a communication passage allowing the first space and a second space for accommodating the coupling to communicate with each other; and
   a blocking member disposed between the gear mechanism and the communication passage,
   wherein the gear mechanism is disposed so that an output shaft of the gear mechanism is positioned on a vertically lower side or upper side with respect to the motor shaft;
   wherein in a case where the gear mechanism is disposed so that an output shaft of the gear mechanism is positioned on a vertically lower side with respect to the motor shaft, an opening disposed on a first space side of the communication passage is positioned on a vertically upper side with respect to the motor shaft.

2. The gear device according to claim 1,
   wherein when viewed in a vertical direction, at least a portion of the blocking member overlaps a gear closest to the blocking member out of gears of the gear mechanism.

3. The gear device according to claim 2,
   wherein when viewed in the vertical direction, the blocking member overlaps an entity of the gear closest to the blocking member.

4. The gear device according to claim 2,
   wherein the gear mechanism comprises a low speed shaft and a high speed shaft rotated at higher speed than the low speed shaft, and
   wherein in a case where the high speed shaft is disposed above the low speed shaft, the blocking member is located above the gear closest to the blocking member.

5. The gear device according to claim 1, further comprising:
   a casing that defines the first space; and
   a reinforcing member that connects the casing and the blocking member to each other.

6. The gear device according to claim 1,
   wherein the gear mechanism comprises a low speed shaft and a high speed shaft rotated at higher speed than the low speed shaft, and
   wherein in a case where the gear mechanism is disposed so that the high speed shaft is positioned on a vertically upper side with respect to the low speed shaft, a liquid level of the lubricant is positioned on a lower side of the high speed shaft, in a state where the lubricant no longer moves when an operation of the gear device is stopped.

7. The gear device according to claim 6,
   wherein the high speed shaft is the input shaft,
   wherein the gear device further comprises a first driving gear provided on the input shaft and a second driven gear meshing with the first driving gear, and
   wherein in a case where the gear mechanism is disposed so that the first driving gear is positioned on a vertically upper side with respect to the second driven gear, the liquid level of the lubricant is, in a state where the lubricant no longer moves when the operation of the gear device is stopped, located at a position where the liquid level overlaps the second driven gear when viewed in an axial direction of the second driven gear or above the position.

8. The gear device according to claim 7,
   wherein in a case where the gear mechanism is located so that the first driving gear is disposed on a vertically upper side with respect to the second driven gear, the liquid level of the lubricant is, in a state where the lubricant no longer moves when the operation of the gear device is stopped, positioned above a shaft which supports the second driven gear.

9. The gear device according to claim 6, further comprising:
   an oil seal that seals between the first space and the second space,
   wherein in a case where the high speed shaft is located above the low speed shaft, the liquid level of the lubricant is, in a state where the lubricant no longer moves when the operation of the gear device is stopped, positioned at a position lower than the oil seal.

10. The gear device according to claim 1,
    wherein a casing that defines the second space comprises an opening portion into which a tool for coupling the coupling with the casing is inserted and on which a cover member is mounted, and
    wherein a clearance through which air flows via the opening portion is disposed between the second space and an exterior.

11. The gear device according to claim 10,
wherein the cover member is capable of being attached to and detached from the opening portion in a state where the motor and the gear mechanism are connected to each other.

12. The gear device according to claim 1, further comprising:
an oil seal that seals between the first space and the second space.

13. The gear device according to claim 12,
wherein the number of the oil seals is larger than the number of oil seals located on one side of the output shaft.

14. The gear device according to claim 1,
wherein the blocking member comprises an arc shape.

15. The gear device according to claim 1,
wherein the motor shaft is a portion which protrudes from a main body of the motor to a coupling side,
wherein the second space accommodates the motor shaft, and
wherein the second space and a space for accommodating the main body of the motor do not communicate with each other.

16. The gear device according to claim 1,
wherein the second space is defined by an end surface of the motor and a casing accommodating the gear mechanism.

17. A gear device comprising:
a motor having a motor shaft;
a gear mechanism;
a coupling that couples the motor shaft and an input shaft of the gear mechanism with each other;
a first space accommodating the gear mechanism and holding a lubricant;
a communication passage allowing the first space and a second space for accommodating the coupling to communicate with each other;
a blocking member disposed between the gear mechanism and the communication passage;
a casing that defines the first space; and
a reinforcing member that connects the casing and the blocking member to each other,
wherein the reinforcing member comprises a greasing hole through which the lubricant is supplied to the first space, and
wherein a lid member is mounted on the greasing hole.

* * * * *